United States Patent [19]

Howden

[11] Patent Number: 4,484,798
[45] Date of Patent: Nov. 27, 1984

[54] METHOD OF MANUFACTURING A MULTIPLE MIRROR REFLECTOR FOR A LAND BASED TELESCOPE

[75] Inventor: Harry Howden, Smallfield, England
[73] Assignee: U.S. Philips Corporation, New York, N.Y.
[21] Appl. No.: 371,092
[22] Filed: Apr. 23, 1982
[30] Foreign Application Priority Data May 1, 1981 [GB] United Kingdom ............... 8113525

[51] Int. Cl.³ ............................................. G02B 5/10
[52] U.S. Cl. .................................. 350/601; 350/625; 427/163; 427/166
[58] Field of Search ............... 350/292, 293; 427/163, 427/166

[56] References Cited

U.S. PATENT DOCUMENTS 3,422,495  1/1969  Jones ..................................... 350/293
4,115,117  9/1978  Nelson ................................... 350/293
4,124,277  11/1978  Stang ..................................... 350/292
4,218,114  8/1980  Bunch .................................... 350/292
4,226,657  10/1980  Cottingham ......................... 350/292
4,268,118  5/1981  Palmquist et al. ................... 350/128

FOREIGN PATENT DOCUMENTS 1191616  5/1970  United Kingdom ............... 350/293

Primary Examiner—John K. Corbin
Assistant Examiner—Lynn Vandenburgh Kent
Attorney, Agent, or Firm—Robert J. Kraus

[57] ABSTRACT

A method of manufacturing a multiple mirror reflector for land based telescopes. At least one series of identical segments are mounted on a rigid support to form a large primary reflector with each segment forming a part of the total profile. Each segment includes an accurately profiled reflective metal layer bonded to a concave surface of a substrate by an adhesive layer. The layer is formed on the appropriate substrate surface by transfer replication.

7 Claims, 3 Drawing Figures

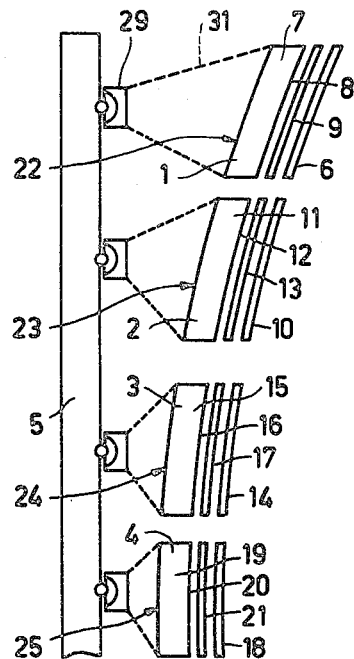
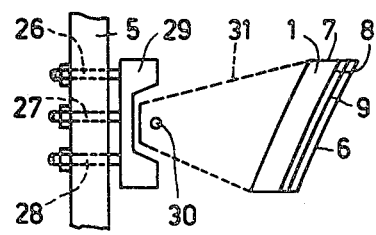
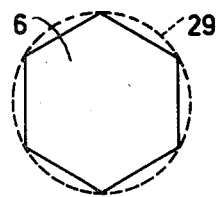
FIG.1
FIG.2
FIG.3

METHOD OF MANUFACTURING A MULTIPLE MIRROR REFLECTOR FOR A LAND BASED TELESCOPE

BACKGROUND OF THE INVENTION

The present invention relates to a method of manufacturing a multiple mirror reflector for a land based telescope for the reflection of short-wave electromagnetic radiation which comprises bonding a reflective layer to a concave surface of a substrate and mounting the substrate on a dished rigid support.

It is known that an increase in the detail of information collected from very faint objects in space may be obtained by an increase in the diameter size of the telescope reflectors used by astronomers. Telescopes with reflectors larger than the known large reflector of the 5 meter telescope on Palomar Mountain are necessary to improve the collection of data from short wave radiations. Large reflectors of several meters in diameter for collecting relatively long radio waves from space are known and used successfully because the difficult engineering problems and engineering tolerances required to make such reflectors are less stringent than the tolerances required for making reflectors which operate in the short wave electromagnetic radiations range, including visible and/or infra-red light radiations. In general, for a primary collecting reflector to be effective in collecting information from short wave radiations from faint and distant objects the reflector has to have both a large electromagnetic radiation collecting area, as represented by the diameter of a single dish reflector or the diameter of each of several dish reflectors, and an accurate surface profile which varies across the diameter of each dish reflector by preferably, no more than about one tenth of a wave length of the radiation received. In the known large reflectors which collect the relatively long radio waves having wave lengths, of a few centimeters, for example, a surface profile deviation of the reflector used of approximately 1 millimeter are attainable by normal high precision engineering practice. For shorter wavelength radiations, in the visible light and/or infra-red regions, a surface profile deviation of the reflector of approximately a few millionths of a centimeter is required. The engineering problems for manufacturing reflectors consequently become more acute with such an increase in surface accuracy in relation to the diameter of the reflector, and in relation to a reduction in wavelength of the radiations under examination. Various attempts to improve the efficiency of radiation collection of short wave length radiations have been made as for example, in the known large telescopes which have a single 5.1 meter (200 inch) diameter reflector and in a Russian 6 meter diameter reflector. Various other attempts to improve the efficiency of collecting short wave radiations include (a) a multiple mirror type telescope which comprises an array of several medium sized telescopes accommodated on the same altazimuth mounting, (b) a primary mirror type telescope where the mirror comprises a section of a sphere composed of closely fitting hexagonal mirrors which can rotate about a vertical axis, (c) a primary mirror type telescope where a fully steerable dish is composed of a large number of separate reflective elements which are individually focussed and aligned, and (d) a conventional type telescope where the primary reflector mirror comprises a thin monolithic primary mirror of low overall weight.

A considerable saving in cost is effected in the later case by reducing the overall weight of the primary mirror and in one example a primary reflector mirror of this type (type d) has been manufactured with a reflector of 3.8 meter in diameter.

However, in order to obtain the necessary wide range of data collection for making readings in optical spectroscopy and to determine for example, the distance, composition, luminosity, the red shift, the rotation speed and the temperature of distant objects a collecting area of the primary reflector mirror or mirrors should be even larger and preferably the reflector should at least be equivalent to a 25 meter diameter mirror.

A primary mirror telescope which has a fully steerable dish reflector composed of a number of separate reflective, individually focussed elements is known for reflecting electromagnetic radiations in the millimeter and submillimeter wave bands from United Kingdom Pat. No. 1,546,645. To produce the separate reflective elements there is described in the United Kingdom Pat. No. 1,546,645 a method of producing by moulding a plurality of substantially identical reflectors to give at least one series of the reflectors. These reflectors are described as being capable of being used individually or assembled together to form a large reflector. The method of producing the reflector, or series of reflectors, however is by moulding. In the known method, each reflector comprises a concave reflector foil bonded to a support member and is formed from a resiliently-flexible plastics foil which is coated on at least one surface with a radiation reflective layer, the foil is applied to the surface of a master moulding tool and tension is applied to the foil so that, at least at its periphery, stretching occurs and the foil takes up the profile of the convex surface, the foil being bonded to the support member while positioning the concave surface of the support member in close proximity to, but substantially uniformly spaced from, the tensioned foil, filling the space between the support member and the foil with an adhesive liquid resin, causing the liquid resin to set whilst maintaining the foil in the stretched condition and separating the master moulding tool from the bonded foil and support member.

The reflector elements of United Kingdom Pat. No. 1,546,645 have the disadvantage in that the reflective layer of each element is formed from the tensioned concave reflector foil which is stretched, at least at its periphery, in order to take up the profile of the convex surface of the master moulding tool. Consequently the radiation reflective layer comprising the resiliently flexible plastics foil of each element, is not of uniform thickness over the whole of its surface. Moreover, as the radiation reflective layer is very thin, as commonly is the case for vapour deposited metal coated plastics foil, the stretched radiation reflective layer may also become radiation transparent to short wave electromagnetic radiations. Thus, with stretching, both the radiation reflective layer and the plastics foil over the convex surface of the mould result in a differential thickness change which alters the resultant reflective profile of the reflector and which, because the wavelengths of short wave, infra-red and optical light, are smaller than the wavelengths of radio waves by a factor of approximately 100,000 causes a surface change in the profile of the stretched plastics foil which is greater than the aforesaid tolerance limits of a few millionths of a centimeter.

In another known method in the manufacture of a primary mirror reflector of a close fitting segmented mirror construction, a similar disadvantage of surface profile change which is outside the tolerance limits has been found to occur. For example, in the construction of a close fitting segmented mirror reflector the primary mirror may be composed of more than 1000 separate reflective elements which are assembled together and are individually focussed and aligned on a continual basis dependent upon the primary reflector's profile size, shape and optical focussing requirements. Each reflector element, furthermore, during its manufacture has to be separately cast, ground and polished to an appropriate correct profile which is then shaped in surface area to ensure a close fitting segmented construction. The reflector element preferably is manufactured to a general profile shape by moulding a material, such as, glass, particularly a low thermal coefficient of expansion glass, which is subsequently subjected to grinding, polishing and shaping processes. The shaped reflector element is then stress relieved so as to form a geometrically stable profile or part profile for accurate assembly and alignment on the segmented reflector. This method is clearly a long and expensive process particularly as each reflector element of any one series of elements has slightly different physical properties so thay they respond differentially to any change in the environmental conditions, such as a change in temperature.

Deformation of the profile of such reflector elements has been found to be unpredictable and uncontrollable even when the reflector elements have been prepared with great care in a desired constant and standard manner. Material, for example may be required to be removed from the edge of the profiled element, for the final purpose of removing any edge run-off inaccuracies, or for forming a shaped hexagonal element of one series of reflective profiled elements from another slightly larger series of shaped elements; and, any removal of material from one profiled element results in producing an element which differs from other elements in profile changes in use.

SUMMARY OF THE INVENTION

One object of the present invention is to provide a method of producing an electromagnetic radiation reflector which mitigates the aforesaid disadvantages.

Another object of the present invention is to provide an electromagnetic radiation reflector which when manufactured by the method according to the invention is of a simple, lightweight and inexpensive construction when compared with a known electromagnetic radiation reflector of comparative similar diameter size and/or collecting area.

According to the present invention there is provided a method of manufacturing a multiple mirror reflector for a land based telescope for reflecting short-wave electromagnetic radiation comprising bonding a reflective layer to a concave surface of a substrate and mounting the substrate on a larger, dished rigid support, characterised in that at least one series of identical reflector segments are prepared, each reflector segment of a series comprising a substrate and a reflective layer bonded thereto by an adhesive, a segment being formed by transfer replication of an ultra-thin accurately profiled layer of reflective metal from the surface of a master mould tool to the surface of the substrate, the or each series of segments being assembled and individually mounted on the large, dished rigid support to form separate parts of a single profile of the reflector with a common focus for reflecting the radiation.

The expression, "transfer replication" is understood to mean the transfer of the accurately profiled ultra-thin layer of the reflective metal on a master mould tool so that the original outer surface of the ultra-thin layer becomes the inner surface bonded to the substrate by the adhesive. The ultra-thin layer furthermore may be strengthened by increasing its thickness with the deposition of an additional backing material, for example, to provide a second or third metallic layer.

In one embodiment of the invention the adhesive has a low coefficient of contraction on curing on bonding the metal layer to the surface of the substrate. The reflective metal layer may be deposited on the moulding surface of an optically polished siliceous master mould tool by vapour deposition prior to removal therefrom by bonding for each segment, by a low contraction-on-curing adhesive. The low cure contraction adhesive is preferably a solvent free adhesive which shrinks by less than 1% on curing.

A particularly suitable adhesive preferably is cured to the fully hardened and set form at substantially ambient temperatures. With such an adhesive, problems due to thermal expansion of the mould and substrate are kept to a minimum as are the dimensional changes produced by thermal coefficient of contraction of the cured adhesive.

Cold-setting adhesives are suitable as are certain thermo-setting adhesives providing the adhesive is minimally heated to just above ambient temperatures in order to effect the cure or to shorten the cure-time that the adhesive is in contact with the master mould tool. Adhesives which are cured by irradiation are also suitable. Hot melt adhesives are not suitable because of the adverse thermal expansion effect which acts differentially on the component parts of the substrate, the mould and the transfer replication reflective layer due to their differing thermal capacities.

The specularly reflective metal layer is deposited on the moulding surface of an optically polished glass master mould tool by metal vapour deposition. The moulding surface may be provided with, if desired, a pre-treatment by coating the surface with a thin layer of a metal release agent, such as, a silicone, an inert hydrocarbon, a grease or a liquid detergent. The thin layer may comprise a substantially monomolecular layer of the release agent which is provided as a coating on the surface of the master mould tool so that the profile and surface finish of the master mould tool is substantially unchanged. The surface of the metalized resin coated substrate may, furthermore if desired, be coated with an additional layer of vapour deposited metal after removal from the master mould tool.

In order to effect easy mould release of the ultra-thin reflective metal layer deposited on the moulding surface of the master mould tool it is advantageous to have the substrate of a good elastically deformable material. Glass for example, is particularly suitable in this respect. Such a substrate with the adhesive layer bonding the reflective layer to the concave surface can then be released from the convex surface of the master mould tool without causing distortion or damage to the ultra-thin reflective metal layer by the application of a low sheer force to the substrate at the interface of the bonded reflective layer to effect removal. The substrate in being of an elastic material, such as, glass with elastic limits within the sheer stress limits for removal of the deposited thin reflective layer on the master mould tool, returns to its natural shape on removal and the profile of the reflective layer remains identical to that of the master mould tool.

In order to assist mould release and to avoid penetration of adhesive through the thin reflective metal layer on the master mould the specularly reflective metal layer may comprise a first layer of a vapour deposited metal, such as aluminium, and a second layer of another harder inert metal such as, nickel, chromium, copper or an alloy thereof, which is deposited by metal vapour deposition, sputtering or by electro-chemical deposition on the first thin layer.

The master mould tool is coated with a thin layer of metal appropriate to the subsequent infra-red, optical and/or short wave requirements. The metal which is deposited as the ultra-thin layer on the convex surface of the master mould tool may be aluminium, or gold although other reflective metal films such as, copper, tin or nickel may also be suitable for certain applications.

The ultra-thin reflective layer initially deposited on the convex surface of the master mould tool may have one or more metal backing layers. Such a metal backing layer may serve as blocking layer referred to above to prevent penetration of the adhesive, prior to curing, through minor faults or pin holes, to the highly polished and accurately profiled surface of the master mould tool. The backing layer may also serve to reinforce the thin metal reflective layer on transfer replication. Moreover, the backing layer can assist the thin metal reflective layer in radiation reflection for radiation waves which penetrate the reflective layer.

If desired, the thin reflective layer may have a plastics backing layer, optionally with a metal filler for the above reflective purposes, so that bonding of the adhesive to the thin reflective layer is enhanced. The backing plastics layer, if present, may be separately applied and cured.

According to one preferred embodiment of the invention the substrate and the master mould tool are each fabricated from a hard inert low coefficient of thermal expansion material such as, silica, quartz or glass which material is machined, cast or moulded into approximately the desired shape. The master mould tool is further surface machined and smooth polished and lapped to an accurate profile shape and surface finish of a negative convex profile to within 0.1 mm of the desired shape of the reflector.

Glass, particularly glass of an identical zero or a very low thermal coefficient of expansion, is particularly suitable for fabrication of both the substrate and the master mould tool. The property of good elastic deformability allows for effective mould release of the segment from the master mould tool by effecting a slight temporary deformation of the substrate when applying a force to the profiled thin metal layer bonded to the surface of the substrate by the cured or set adhesive.

The adhesive may be applied to the concave surface of the substrate in liquid form prior to contact with the accurately profiled thin layer of the specularly reflective metal and the master mould tool, and subsequently the liquid adhesive is hardened to bond the accurately profiled metal layer to the concave surface with a film of the hardened adhesive therebetween. Other methods of applying the liquid adhesive to the space between the surfaces can be employed.

In another method of the invention a first series of identical segments are located on the single, rigid support in the form a peripheral ring, each segment of the first series having an identical part profile of the desired reflector profile, and a second series of identical segments each with another part profile of the desired reflector profile are located on the rigid support in a second ring of radius innermost to the peripheral ring, said segments forming a common reflective surface for the short wave radiations, and wherein, said segments are each mounted in their finished shape on removal from the moulding tool without any further shape modification comprising cutting, edge grinding, surface polishing and/or thermal or mechanical stress relieving.

The multiple mirror reflector according to the invention comprises a plurality of identical reflective segments mounted on the rigid support as at least one series of reflective segments wherein each reflective segment has an accurately profiled thin, reflective metal layer bonded to the concave surface of a substrate by an intermediate adhesive layer and wherein the reflective segments of the one series are identical to each other, or of the other series are identical to each other with the segments individually mounted on the rigid support as to form a common focus for reflecting shortwave electromagnetic radiations.

The rigid support may be rotatable as a fully steerable dish with the reflective segments rigidly or adjustably mounted thereon. More than one rigid support having the separately mounted reflective segments thereon according to the invention may be used in the form of an array of linked beam multiple mirror reflectors. The total collecting area of each multiple mirror reflector according to the invention may then, if desired be reduced to that of a medium sized telescope. The multiple mirror reflector according to the invention may alternatively comprise a primary mirror which is a section of a sphere and which is composed of a number of close fitting hexagonal, or otherwise shaped, reflective segments. The reflective segments are shaped so that when they are mounted on the rigid support, preferably, they are close fitting to each other.

It has been found by the applicants however, that the primary mirror's reflective efficiency is dependent upon the profile accuracy of the reflective surface of each segment, the total collecting area and the accurate positioning and alignment of each segment separately mounted on the rigid support. Accordingly therefore the shape of each segment is determined in dependence with these factors, rather than on a shape suitable for the close fitting requirement of a particular size of reflector.

BRIEF DESCRIPTION OF THE DRAWING

In order that the invention may be readily carried into effect an embodiment thereof will now be described by way of example, with reference to the accompanying diagrammatic drawing in which:

FIG. 1 shows a schematic cross-sectional view of a part of a multiple mirror reflector when produced by the method according to the invention.

FIG. 2 shows a cross-sectional view of a segment of FIG. 1 together with means for finely adjusting the position of the segment on the rigid support.

FIG. 3 illustrates a plan view of a shaped segment of FIGS. 1 and 2.

DESCRIPTION OF THE PREFERRED EMBODIMENT

In FIG. 1 a part of a large multiple mirror reflector is shown in cross-sectional exploded view where a number of segments 1, 2, 3 and 4 are individually mounted on a rigid support 5. The segments 1, 2, 3 and 4 each represent a series of identical segments individually mounted in a circumferential manner on the rigid support 5 to form a dish-shaped multiple mirror reflector.

The segment 1 of a first series of segments comprises an accurately profiled, ultra-thin specularly reflective layer of metal 6 bonded to a substrate 7 having a concave surface 8 by means of an adhesive 9. For clarity the layers are separately illustrated in FIG. 1.

The segment 2 of a second series of identical but differently profiled segments from the first series comprises an accurately profiled ultra-thin specularly reflective layer of metal 10 bonded to a substrate 11 having a concave surface 12 by an adhesive 13. Segments 3 and 4 of a third and fourth series respectively, in a similar manner have further identical, but different from the other series, profiled layers wherein the specularly reflective layer of metal 14 and metal 18 are bonded to substrate 15 and substrate 19 respectively. An adhesive layer 17 bonds the specularly reflective layer of metal 14 to the concave surface 16 of substrate 15, and another adhesive layer 21 bonds the specularly reflective layer of metal 18 to the concave surface 20 of substrate 19. Because of the variable geometry of the various profile forms that the concave surfaces 8, 12, 16 and 20 of respective substrates 7, 11, 15 and 19 may take, and as the result of various slightly different production techniques for producing each substrate 7, 11, 15 and 19, the thicknesses of the adhesive layers 9, 13, 17 and 21 bonding the appropriate, accurately profiled, metal layers, 6, 10, 14 and 18 may vary with respect to each other. The adhesive thickness, in general however, is constant for any one series of segments; the profile being determined by the profile of the appropriate master mould tool and maintained on transfer replication according to the method of the invention.

In FIG. 2 there is illustrated in more detail, a shaped segment, segment I of the first series FIG. 1, in which the substrate 7 is attached to the rigid support 5 by pivotally adjusting means for example, by a support member 29 and ball pivot member 30. Rigid locating strut members 31 are also present and these are indicated by dotted lines for each segment 7, 11, 15 and 20 of FIG. 1 and FIG. 2. Fixing bolts 26, 27 and 28 are also shown. The bolts 26, 27 and 28 are equi-distantly spaced on the base of the substrate 1 and pass through the rigid support 5 so that on attaching a fine adjustment can be made and the part-profile 6 of the segment 1 accurately aligned with the adjacent part profile(s) of segments of the same series (not shown) and segments of the series 2, 3 and 4. As each segment has a predetermined shape an extremely accurate profile for the reflector as a whole can readily be obtained.

In FIG. 3 is a plan view of a segment (segment 6) is shown where the segment is a regular hexagon. A series of segments of hexagonal shape are produced from a master mould tool which have a substantially circular shape in plan view, and the planar shape is formed from the appropriate substrates (substrate 1) each of which have the specularly reflective ultra thin metal layers bonded to the surfaces according to the invention. The surplus vapour deposited metal layer, in each case, as represented by the dotted line 29 FIG. 3, is easily removed from the surface of the master mould tool after moulding. Other shapes may also be prepared to form a close fitting multiple mirror assembly.

The segments 1, 2, 3 and 4 of each series are alternatively attached to the surface of the rigid support 5 by any known means such as, clips and/or pivoted connection bolts with fine adjusting threads. The segments when mounted on the rigid support 5 are finely adjusted in position for final focussing and optical alignment. However, the substrates 7, 11, 15 and 19 are fabricated of a material which is of sufficient thickness and which is stress relieved for each segment to be dimensionally stable with regard to thermal changes.

If desired the substrates 7, 11, 15 and 19 each have a flat, ground, rear mounting surface 22, 23, 24 and 25 for accurate positioning on pivotally adjustable, preselected closely positioned locations on the support 5.

The substrates 7, 11, 15 and 19 of each series are separately prepared and each substrate 7, 11, 15 and 19 has an approximately accurate concave profiled surface 8, 12, 16 and 20 respectively prepared as hereinafter described.

The substrates of each series are prepared from a hard, inert material of a low coefficient of thermal expansion, such as, a glass, quartz or silica which initially is used in sheet or block form. Suitable low thermal expansion siliceous materials are borosilicates and silicate glasses, known under the trade names, of Ultra-low expansion glass (U.L.E); Corning Glass Works, No. 7971 and Schott Zerodur glass. Alternatively a low thermal expansion titanium silicate is particularly suitable. The later silicate is a glassy material which also has a low specific gravity. This is particularly suitable for both the master moulding tool and the individual substrates. The individual substrates are conveniently initially shaped by a process known as "hot slumping" which process allows a sheet of hot material, such as glass, to be formed against the curved surface of a hot mould. The curved surface of the slumped substrate after cooling is then fine profile ground to shape. The surface may be moulded, machined or ground to form the approximate shape of the desired profile. It is unnecessary, for reasons described above, to control the thickness of the adhesive used in transfer replication. It is also not necessary to finely polish the surface of the substrate or to grind the surface to an accuracy greater than 5 μm. A planar shape for each substrate component is then formed by sawing, cutting and/or edge grinding each substrate to a suitable size for subsequent assembly at a predetermined location on the rigid support 5.

Suitable shapes of the substrate may be disks or regular polygons, such as, profiled hexagonal sheets optionally for a close fitting assembly. It is not necessary to remove internal stresses in the material at this stage by a thermal treatment of the profiled and shaped substrates so produced. One or more accurately profiled and optically polished moulding tools are then prepared. At least one moulding tool is prepared for each series of segments to be produced. Each moulding tool prepared has a moulding surface with a negative profile or part profile of the reflector.

The material used for each moulding tool is of a low coefficient of thermal expansion material, such as, a glass quartz, silica or a silicate and is preferably identical in composition to the material used for fabricating the or each substrate. Conveniently, each master moulding tool is manufactured so that it has a moulding surface which is slightly oversize in area to the segment produced therefrom so that any edge defects, such as, edge roll-off defects due to the glass polishing operations falls outside the desired effective reflective area of the finished transfer replicated segment.

The convex surface of the master moulding tool may be surface machined, lapped and optically polished to a profile accuracy and surface finish of 0.1 wave of the incident radiation and preferably is optically polished to an accuracy of 0.05 wave. The substrate surface may be prepared to an approximate profile to an accuracy within 10 μm of the desired profile and preferably to 5.0 μm. The thin layer of the specularly reflective metal deposited on the polished, moulding surface of the master mould tool is preferably, deposited by a vacuum evaporation or by a metal sputtering technique.

In one embodiment the deposited metal is aluminium of 0.01 μm thick. A backing or blocking metal layer was deposited on the ultra-thin metal coated moulding surface to prevent penetration of the adhesive resin subsequently used from passing through defects, such as, pin holes in the ultra-thin metal layer. The backing layer also provided additional strength to the initial metal layer. The backing metal layer was a thin layer of nickel of thickness of from four to ten times the thickness of the initial vapour deposited aluminium layer and was deposited by metal sputtering on the thin, initially deposited layer.

The profiled surface of the titanium silicate glass substrate of from 5 to 10 μm of the desired profile accuracy was then placed in close proximity to the metal coated moulding surface of the master mould and the space between the two surfaces was filled with a liquid epoxy polymerizable adhesive of a low viscosity. The space between the two surfaces was limited mechanically to 0.1 mm by means of a gasket material which surrounded the periphery of the master mould.

In an alternative embodiment a mechanical stop member was provided and the liquid adhesive was contained within the concave surface of the substrate.

The adhesive was allowed to harden at normal ambient temperatures and the thin layer was transfer replicated onto the surface of the substrate and bonded thereto by the hardened adhesive prior to removal of the substrate from the mould. In a further embodiment a very thin film of a release agent comprising a silicone oil was applied to the moulding surface of the mould tool prior to deposition of the ultra-thin metal layer.

The metal layer was transfer-replicated from the master mould tool surface to the concave surface of the substrate in each case without deformation of layer of metal.

I claim:

1. A method of making individual mirrors for use in a multiple mirror reflector for reflecting short-wave electromagnetic radiation, said method comprising the steps of:
   a. forming a substrate having a surface which approximately conforms to a predefined profile for the respective mirror;
   b. depositing a reflective metallic layer on a polished molding tool surface which accurately conforms to the predefined profile for the respective mirror;
   c. positioning the surface of the substrate and the reflective metallic layer in close proximity to each other, leaving sufficient space between said surface and said layer so they do not touch;
   d. filling the space with an adhesive;
   e. allowing the adhesive to cure sufficiently to bond the reflective metallic layer to the substrate; and
   f. breaking the reflective metallic layer free from the molding tool surface and separating the substrate, with said layer bonded thereto, from said tool.

2. A method as in claim 1 where the adhesive has a low coefficient of contraction while curing.

3. A method as in claim 1 or 2 where the molding tool surface is coated with a layer of a release agent before deposition of the reflective metallic layer, and where said layer is deposited by vapor deposition.

4. A method as in claim 1 or 2 where, after depositing the reflective metallic layer, a layer of a hard inert metal is deposited onto said reflective metallic layer.

5. A method as in claim 1 or 2 where the substrate and the molding tool are each fabricated from a siliceous material which is hard, inert and has a low coefficient of thermal expansion.

6. A method as in claim 5 where the siliceous material has good elastic deformability and where the reflective metallic layer is broken free from the molding tool surface by applying to the substrate a force which causes a slight temporary deformation of the substrate.

7. A method as in claim 1 or 2 where the adhesive is applied to the surface of the substrate before positioning said surface and the metallic layer in close proximity, and where the space is filled with the adhesive by pressing the substrate and the molding tool against each other.

* * * * *